Sept. 8, 1925.  1,553,116
A. A. SMART
ANTISKID DEVICE AND SECURING MEANS THEREFOR
Filed Feb. 3, 1925    2 Sheets-Sheet 1
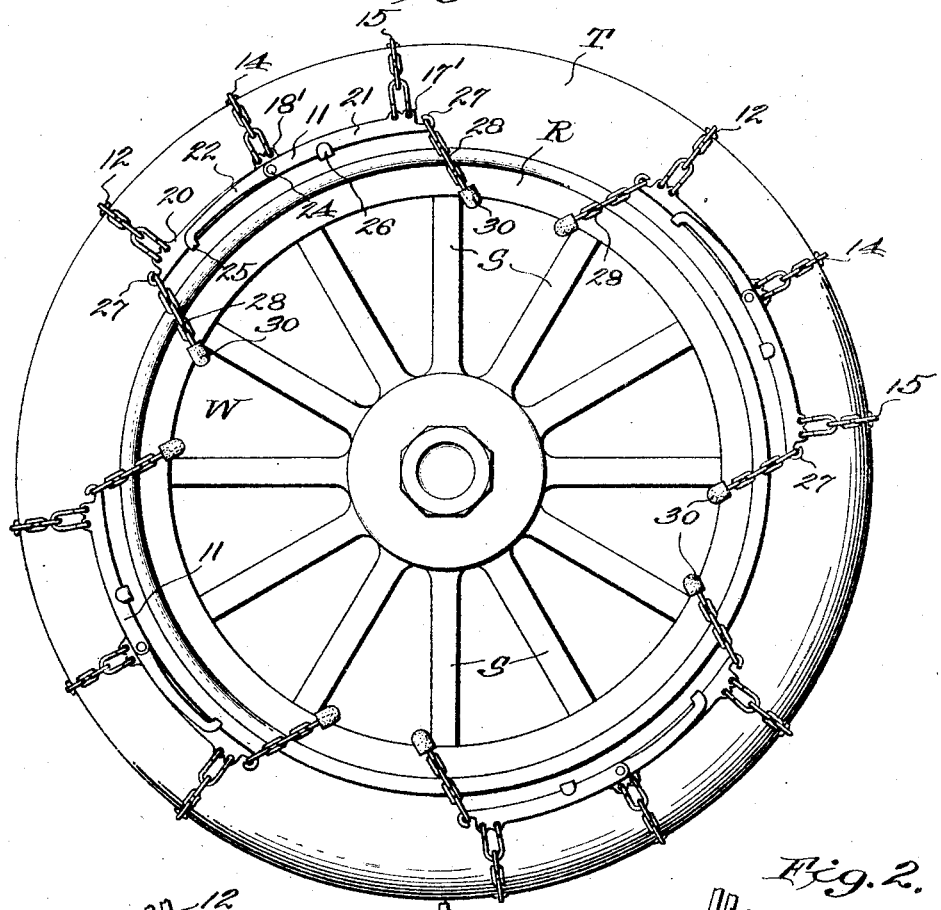
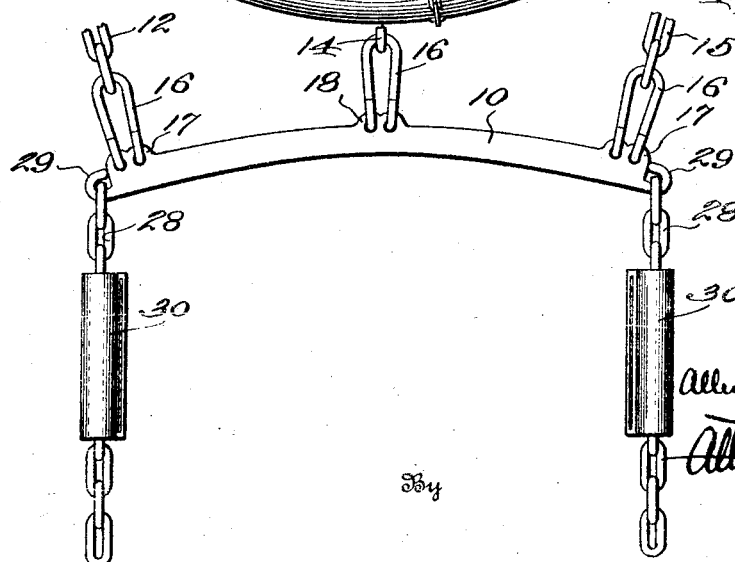

Sept. 8, 1925.

A. A. SMART 1,553,116

ANTISKID DEVICE AND SECURING MEANS THEREFOR

Filed Feb. 3, 1925    2 Sheets-Sheet 2

Inventor
Allen A. Smart
By Allan Peck
Attorney

Patented Sept. 8, 1925.

1,553,116

UNITED STATES PATENT OFFICE.

ALLEN A. SMART, OF CAMERON, MISSOURI.

ANTISKID DEVICE AND SECURING MEANS THEREFOR.

Application filed February 3, 1925. Serial No. 6,631.

*To all whom it may concern:*

Be it known that I, ALLEN A. SMART, a citizen of the United States of America, and a resident of Cameron, county of Clinton, State of Missouri, have invented certain new and useful Improvements in Antiskid Devices and Securing Means Therefor, of which the following is a specification.

This invention relates to certain improvements in anti-skid devices and fastening means therefor; and the nature and objects of the invention will be readily recognized and understood by those skilled in the art in the light of the following explanation and detailed description of the accompanying drawings illustrating what I at present consider to be the preferred embodiments or mechanical expressions of my invention from among various other forms, arrangements, combinations and constructions of which the invention is capable within the spirit and scope thereof.

The invention is directed to anti-skid or traction devices of the so-called "chain" types for use on and with the tires of automotive and the like vehicles, to prevent skidding or slipping of such tires, as well as to increase the traction thereof, under unfavorable road or surface conditions. With the chain type of anti-skid devices considerable difficulty is encountered in applying and removing such devices to and from the tire of a vehicle, and in tightly securing and maintaining the same in proper operative position on a tire against slipping or creeping thereon under the severe conditions to which subjected in service. Further, with the anti-skid devices of the "chain" type adapted to extend completely around the circumference or tread of a tire, it is a very disagreeable and tedious operation to apply and properly fasten and secure the device on and around a tire under the desired tension and sufficiently tightly to prevent displacement thereof from the tire in use. The application of this type of "chain" requires either that the vehicle be jacked up to raise the wheel tires for access thereto, or that the vehicle be moved to bring the tires onto and over the "chain," which consumes consumes considerable time and frequently results in soiling or injury to the person or clothing of the one applying the device, as will be readily recognized by those familiar with such types of anti-skid devices.

One of the main and fundamental objects of the present invention is to overcome and practically eliminate the foregoing and other difficulties and disadvantages attendant the use of anti-skid devices of the "chain" or similar types, by the provision of an anti-skid device in the form of a unit which is quickly and easily applied to an exposed and readily accessible portion of a vehicle wheel and tire in the desired position and sufficiently tightly to prevent creeping or displacement, and which can similarly be quickly unfastened and removed from the wheel and tire.

A further object of the invention is to provide an anti-skid device for vehicle wheel tires in the form of a unit for mounting in position over and across a portion of the tread of the tire and which can be tightly and securely fastened in position against creeping or slipping by attachment to portions of the wheel on which the tire is mounted without injury to or marring of the wheel.

A further object of the invention is to provide an anti-skid device of the so-called "chain" type which is in the form of a unit for mounting over a portion of the tread of a vehicle wheel tire, and which can be quickly applied to and removed from the tire without the necessity of jacking up the wheel or of moving the same.

Another object of the invention is to provide an anti-skid device of the "chain" type with means for taking up the slack in the device and tightly and securely fastening the same in position over and across the tread of a tire and onto the wheel on which the tire is mounted.

Another object of the invention is to provide improved means for fastening anti-skid devices of the chain type onto a tire and for taking up any slack therein to tightly maintain and lock such devices in proper position on a tire.

A further object of the invention is the provision of an anti-skid unit of the "chain" type for use on vehicle wheel tires, which unit is of simple, strong construction capable of withstanding the strains of service, and which can be readily manufactured at relatively small cost.

With the foregoing general objects, and certain other objects and results in view, which other objects and results will be readily recognized from the following description, the invention consists in certain novel features in construction, and in combinations and arrangements of elements, as will be more fully and particularly referred to and specified hereinafter.

Referring to the accompanying drawings in which similar reference characters refer to corresponding parts throughout:

Fig. 1 is a side elevation of a vehicle wheel and tire with several anti-skid units of the invention mounted and attached thereon.

Fig. 2 is a view in elevation of the inner side member or bar showing the cross chains and wheel engaging chains attached thereto.

Figure 3:
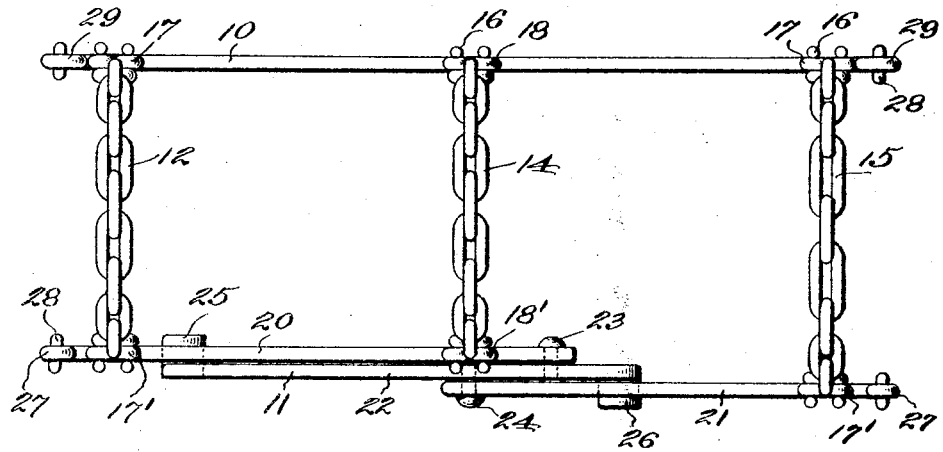
Fig. 3 is a view in top plan of a unit of the invention showing the outer side member with the lever and links thereof inclosed, attached chain tightening position.
Figure 4:
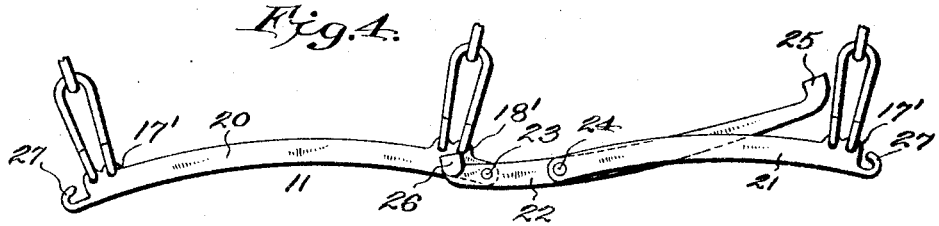
Fig. 4 is a view in elevation of the outer side member of the unit with the lever swung to open, chain loosening position and the links expanded.
Figure 5:
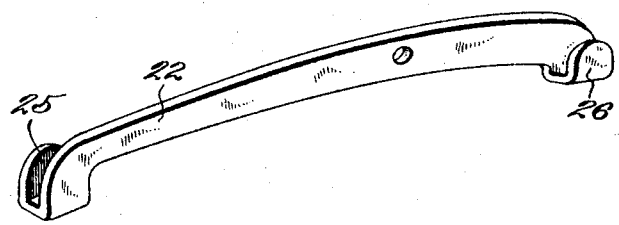
Fig. 5 is a detail perspective view of the operating lever of the outer side member of the unit.

A possible embodiment of the invention is presented in the accompanying drawings and described herewith purely by way of example and not of limitation to permit of explaining the principles and features of the invention, and it will be apparent to those skilled in this art that the invention can be readily mechanically expressed in other ways and that several features thereof are capable of embodiment in and application to other forms and types of anti-skid devices, so that the example hereof is not intended as a restriction of the invention to the particular embodiments hereof.

According to the illustrated example of the invention, an anti-skid unit of the "chain" type is provided for attachment to and removal from a vehicle wheel and a portion of the tread of a tire thereon. This unit embodies the inner and outer curved or arcuate side members or bars 10 and 11 adapted to be disposed at opposite sides of a wheel and tire thereon, and the series of cross chains or traction elements 12, 14 and 15 extending therebetween in substantial parallelism and connected thereto. In the present instance each unit is provided with three cross chains, although any desired number may be employed, similar in construction and each having the hooks or connecting links 16 at their opposite ends for attachment to the side members or bars 10 and 11, respectively. Cross chains 12 and 15 are connected to and extend between corresponding opposite ends of the side members 10 and 11, while cross chain 14 is connected and extends between the central portions of these side members intermediate the end cross chains.

The inner side member or bar 10 is formed of a single piece of material and provides the eyes 17 on the upper side or edge adjacent the opposite ends thereof to receive the hooks 16 of end cross chains 12 and 15, respectively, and the centrally disposed eyes 18 to receive hook 16 of intermediate cross chain 14. The hooks or connecting links 16 are secured in the eyes 17 and 18 against detachment therefrom, as will be clear by reference to the drawings.

The outer side member or bar 11 forms and provides the means for tightening and loosening the unit and the cross chains thereof in applying and removing the unit to and from the wheel and tire. This member 11 comprises the links 20 and 21 and the connecting and operating lever 22 pivotally secured together in such a manner as to permit of moving the links 20 and 21 toward or from each other by swinging the lever 22, these elements being so assembled that in one position thereof the arcuate outer side member 11 is formed similar in general shape and relative mounting with respect to the cross chains, to the inner side member 10. The links 20 and 21 are disposed in substantially longitudinal alinement and continuation with their inner ends overlapping and the lever 22 is disposed between the overlapped ends of the links and extends a distance over and along each lever. The inner end of each link is pivotally connected to the lever 22 at spaced points, respectively, link 20 by the pivot pin 23 and link 21 by the pivot pin 24. Thus, when the lever 22 is swung into position extending along and alined with the links the side member 11 is formed and the links 20 and 21 are drawn toward each other; and when the lever 22 is swung to position laterally of the links, the latter are forced apart or away from each other, due to the spaced pivot points connecting the links with the lever, as will be clear from the accompanying drawings. The lever 22 is formed at its ends with the link engaging and receiving hooks 25 and 26 extending upwardly or outwardly from the lower or inner edge portion thereof toward the adjacent link and disposed at opposite sides of the lever. The hook 26 engages the link 21 and the hook 25 engages link 20 and locks and secures the links and the lever in closed unit attaching position, as will be explained hereinafter.

Each link 20 and 21 is formed at its outer end with a hook 27 and an eye 17' adjacent the hook to receive and to which are attached the end cross chains 12 and 15 by the hooks or connecting links 16, while the link 20 is provided adjacent the inner pivoted end with the eye 18' to which is attached the end of intermediate cross chain 14, by the hook or connecting link 16 thereof.

Wheel and spoke engaging members or chains 28 are provided for securing the unit to a wheel, and these chains are secured at one end to the opposite ends, respectively, of the inner side member or bar 10, suitable eyes 29 being formed in the ends of bar 10 to receive these chains. The chains 28 are provided intermediate their ends with the leather boots 30 or other suitable protecting elements to prevent the chains from marring or injuring the wheel and spokes thereof with which they are engaged in mounted position of a unit. The free ends of chains 28 are formed and adapted to be detachably engaged and secured on the end hooks 27 of the links 20 and 21, respectively, of outer side member 11.

In operation and use, referring now to Fig. 1, an anti-skid unit of the invention formed as above described, is mounted and attached on a wheel W over and across the desired portion of the tread of the tire T in the following manner. The lever 22 of side member 11 is swung to lateral or open position and the unit is placed on the tire with the side member 10 at the inner side of the wheel W and the side member 11 at and accessible on the outer side of the wheel and tire, and the cross chains extending over and across the tire tread between and connected with the said side members. The chains 28 are then passed inwardly between the spokes S of the wheel across the rim R or felly thereof, and their free ends are secured over the end hooks 27, respectively, of the outer side member 11, any desired links of the chains being secured over the hooks so as to properly secure the unit onto the wheel and tire. This arrangement of chains 28 and hooks 27 provides for adjustment of a unit to fit any size of wheel and tire. In order to prevent peripheral or circumferential creeping or slipping of the unit around the wheel, the chains 28 are disposed on opposite sides of the respective spokes S adjacent thereto and against which they bear, as will be understood by reference to Fig. 1 of the drawings. In this connection it will be noted that the protecting boots 30 are located so as to contact with those portions of the rim and spokes over which the chains 28 pass and prevent injury or marring of the wheel. With the anti-skid unit in the foregoing position, the lever 22 is then swung downwardly and the hook portion 25 thereof is forced across link 20 by lateral, outward pressure on the lever, and when the lever reaches closed position this hook snaps over and receives the lower or inner edge portion of link 20, and hook 26 on the opposite end of the lever engages and receives link 21, forming a stop limiting further swing of the lever, thus locking the lever and links in closed, chain tightening position. As the lever 22 is swung to this position the links 20 and 21 are moved toward each other, which draws the cross chains 12, 14 and 15 tightly across the tire tread and similarly tightens the wheel spoke and rim engaging chains 28, thus firmly and securely attaching and fastening the unit into position on the wheel and tire against creeping or slipping and possible displacement in use.

The anti-skid unit can also be readily and quickly detached and removed from a wheel and tire, by forcing the hook 25 from engagement with link 20 and then swinging the lever upwardly to move the links apart or away from each other and loosen the cross chains 12, 14 and 15, and the wheel engaging chains 28. Then, by unhooking or detaching the ends of chains 28 from the hooks 27 of links 20 and 21, the unit can be lifted and removed from the wheel W. It will be here noted that the operating lever 22 of side member 11 and the attached ends of chains 28 are disposed on the outside of the wheel and tire in easily accessible position for attaching and removing the unit.

Any number of the anti-skid units forming the device of the invention can be applied to a wheel, as may be desired or found expedient. A unit is of particular utility as an emergency device when a vehicle is stuck or mired in soft earth, such as mud or sand. Under such conditions, it is only necessary to mount and attach a unit on and over the upper, accessible portion of the wheel and across the tread of the tire thereon, whereupon sufficient traction can then be secured to pull the vehicle from the soft earth in which mired. After the vehicle is driven from the soft earth, the unit can then be quickly detached and removed, as hereinbefore explained. With the unit of the invention, the necessity for raising or jacking up a wheel and tire from the ground, or of moving the vehicle and wheel to various positions, is eliminated as the unit can be applied to the upper, exposed and accessible portion of the wheel and tire. The operation of attaching or removing one of the units can be performed without danger of soiling or injury to the person or clothing, due to the accessibility of the fastening and securing members thereof, and the ease and rapidity of this operation.

Preferably, although not so limited, the side members 10 and 11 are formed of malleable metal to give the required strength and durability. The simplicity of the construction and arrangement of the device is such as to give the necessary strength and durability to withstand the severe strains to which such devices are subjected in service, while retaining the desirable characteristics of being readily and cheaply manufactured.

The chain tightening and slack adjusting features of the side member 11 are not necessarily limited to use with the particular anti-skid unit of the invention, but are capable of embodiment in and use with "chain" anti-skid devices generally, and the invention contemplates and includes such embodiments.

It is also evident that various changes, modifications, variations and substitutions might be resorted to without departing from the spirit and scope of the invention; hence I do not wish or desire to limit myself to the exact and specific disclosures hereof.

Desiring to protect my invention in the broadest manner legally possible, what I claim is:

1. An anti-skid unit embodying separate side bars for mounting at opposite sides of a vehicle wheel and tire, cross chains secured to and extending between said bars for disposal over and across the tread of a tire, wheel engaging members for detachably securing the unit on a wheel and tire, and one of said separate side bars forming means for tightening and loosening said cross chains and wheel engaging members in attaching and removing said unit to and from a wheel and tire.

2. An anti-skid unit embodying side bars for mounting on opposite sides of a vehicle wheel and tire, cross chains secured to and extending between said bars for disposal over and across the tread of a tire, wheel engaging elements for detachably securing the unit on a wheel and tire, and the side member for the outer side of the wheel formed for longitudinal expansion and contraction to loosen and tighten said cross chains and wheel engaging elements.

3. An anti-skid unit embodying inner and outer side members for mounting at the inner and outer sides of a vehicle wheel and tire, cross chains secured to and extending between said members for disposal over and across a tire tread, wheel engaging elements for detachably securing the unit on a wheel and tire, and the said outer side member comprising opposite links and a lever pivotally connecting the same for moving said links toward each other to draw the cross chains and wheel engaging elements into tightened applied position, and away from each other to loosen the chains and elements for removing the unit.

4. An anti-skid unit embodying inner and outer side members for mounting at the inner and outer sides of a vehicle wheel and tire, cross chains connected to and extending between said side members for disposal over and across the tread of a tire, wheel engaging chains secured to said inner member and arranged to extend through the wheel for detachable connection to said outer side member to fasten the unit to the wheel, and said outer side member formed of links and an operating lever pivotally connecting the same to move said links toward and from each other to tighten and loosen said cross chains and said wheel engaging chains, said lever provided with members for engaging said links to lock the same with the lever in chain tightening position with the unit secured on a wheel and tire.

5. In an anti-skid device of the chain type, a series of cross chains adapted to extend across the tread of a tire, and tightening means for said cross chains embodying, separate longitudinally alined lever links to which said chains are connected, and a lever interposed between and pivotally connected to said links for moving the same from and toward each other to tighten and loosen said cross chains.

6. An anti-skid unit embodying side bars for mounting on opposite sides of a vehicle wheel and tire, cross chains secured to and extending between said bars intermediate the ends thereof for disposal over and across the tread of a tire, wheel engaging chains secured at opposite ends of one of said side bars for attachment to the opposite ends, respectively, of the other of said bars to detachably secure the unit on a wheel and tire, and one of said side bars formed for expansion and contraction to loosen and tighten said cross chains and wheel engaging chains.

Signed at Washington, D. C., this 3rd day of February, 1925.

ALLEN A. SMART.